United States Patent [19]
Yarrow et al.

[11] 3,858,107
[45] Dec. 31, 1974

[54] ELECTRICAL GENERATING APPARATUS

[75] Inventors: Christopher John Yarrow, Allerton; Ronald Johnson, Beeston, both of England

[73] Assignee: Lucas Aerospace Limited, Birmingham, England

[22] Filed: Jan. 8, 1974

[21] Appl. No.: 431,738

[30] Foreign Application Priority Data
Jan. 9, 1973 Great Britain................ 1211/73
Mar. 13, 1973 Great Britain................ 12040/73

[52] U.S. Cl................. 322/26, 310/68 D, 310/160, 321/6, 321/62, 322/32
[51] Int. Cl....... H02p 9/42, H02m 1/00, H02m 5/32
[58] Field of Search...................... 321/6, 8, 61–69; 322/32, 26, 93, DIG. 5; 310/68 D, 160, DIG. 3

[56] References Cited
UNITED STATES PATENTS
| | | | |
|---|---|---|---|
| 3,571,693 | 3/1971 | Riaz.................................. | 321/64 X |
| 3,639,820 | 2/1972 | Stemmler.......................... | 322/32 X |
| 3,777,250 | 12/1973 | Kaeser et al..................... | 321/61 X |

Primary Examiner—J. D. Miller
Assistant Examiner—Robert J. Hickey
Attorney, Agent, or Firm—Waters, Roditi, Schwartz & Nissen

[57] ABSTRACT

An electrical generating apparatus includes a d.c. source, e.g. a self exciting engine driven generating set, and an inverter including an armature winding, with tappings spaced around the armature winding. Switch means intermittently connect the d.c. source to the tappings to produce an a.c. output. The switch means may include thyristors triggered by a position sensing device on a shaft driven at a constant speed, a d.c. supplied field winding on this shaft within the armature winding effecting turning off of these thyristors by periodically reversing the emf in the armature winding.

9 Claims, 9 Drawing Figures

ELECTRICAL GENERATING APPARATUS

FIELD OF THE INVENTION

The present invention relates to an electrical generating apparatus.

DISCUSSION OF THE PRIOR ART

Variable speed constant frequency generating systems are known, which systems comprise a high frequency a.c. generator coupled to an aircraft engine gearbox, the variable frequency output of said generator being converted electronically to a constant frequency. The problems of such known systems are concerned with the size and complexity of the required electronic equipment. The foregoing is encountered because of the high power involved, and also because a considerable degree of filtering is required in order to produce an acceptable harmonic free sinusoidal output.

SUMMARY OF THE INVENTION

Accordingly, it is an object of the present invention to provide a constant frequency electrical generating apparatus of an improved form and structure.

In accordance with the present invention, there is provided electrical generating apparatus comprising a source of d.c. supply and an inverter, the inverter comprising an armature winding, a plurality of tappings which are spaced around the armature winding, and switch means for intermittently connecting the d.c. source to the tappings in such a manner that an a.c. output will be produced in use at a terminal or terminals of the armature winding, the frequency of the a.c. output being related to the speed of operation of the switch means.

Preferably, the source comprises an electrical a.c. generator which is drivable by a variable speed prime mover, and rectifying means for rectifying the variable frequency a.c. output of the generator.

Desirably, the switch means comprises a plurality of semi-conductor switching elements equal in number to twice the number of the tappings on the armature winding, each tapping being connected to the junction of two series connected semi-conductor switching elements which are connected across the source of d.c. supply.

Conveniently, the plurality of semi-conductor switching elements thus provided, are switched from a non-conductive to a conductive state in a predetermined sequence by means mounted on a rotatable shaft, the speed of rotation of the shaft determining the rate of switching the semi-conductor switching elements. The semi-conductor switching elements may be in the form of thyristors, each of which has an associated light sensitive firing circuit, and in this case the means may take the form of an apertured drum which, upon rotation in use, passes light sequentially to a plurality of fiber optical cables, one of which is associated with each thyristor firing circuit.

Conveniently, the shaft also supports thereon a freely rotatable field winding, and which is rotatable in use within the armature winding, and arranged to cause the semi-conductor switching elements to be switched from a conductive to a non-conductive state at a predetermined relative position of the field winding and the armature winding. Preferably, but not necessarily, the shaft is rotatably driven by an electric motor which takes its electrical power from the source of d.c. supply. Once the freely rotatable inverter field winding reaches its desired speed, rotation thereof maintained by the interaction of the fields of the inverter field winding and armature. The exciter of the inverter is used as a motor only during starting.

BRIEF DESCRIPTION OF THE DRAWINGS

The invention will now be more particularly described with reference to the accompanying drawings, wherein.

DETAILED DESCRIPTION

Figure 1:
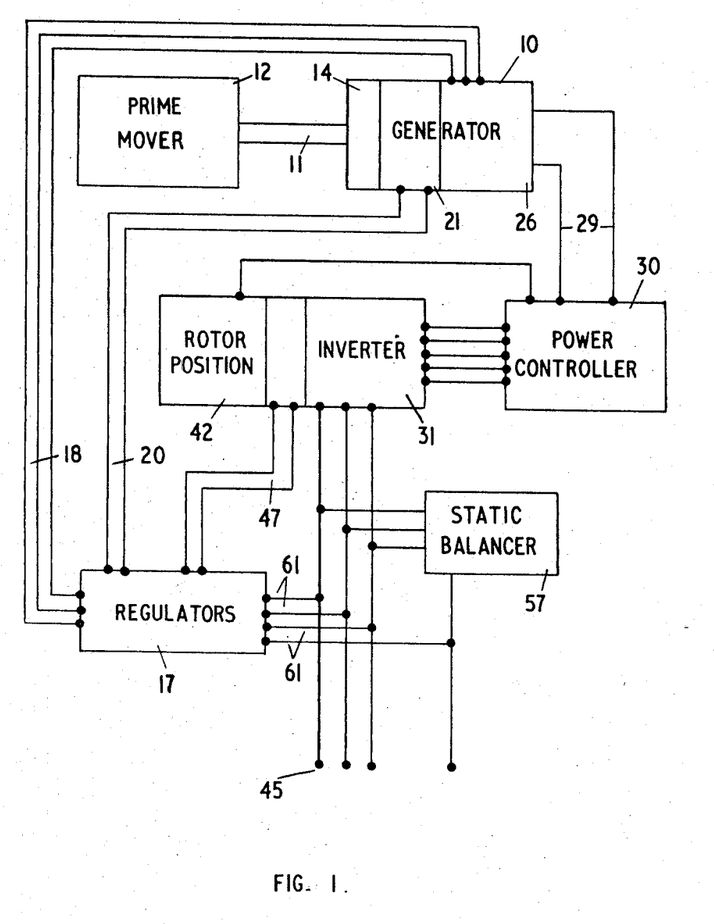
FIG. 1 is a schematic diagram of one embodiment of an electrical generating apparatus constructed in accordance with the present invention.
Figure 2:
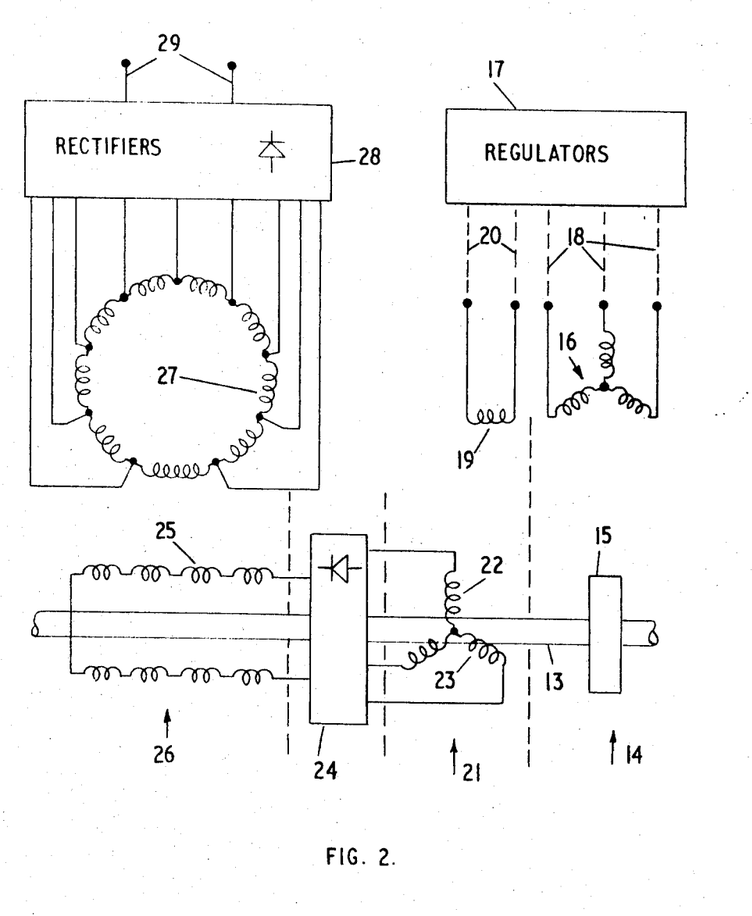
FIG. 2 is a diagrammatic representation of the generator shown in FIG. 1.

Referring now more particularly to the drawings, the electrical generating apparatus, shown more particularly in FIG. 1, comprises a brushless d.c. generator 10 which is mechanically coupled by a shaft 11 to a prime mover 12, the latter of which may be an aircraft engine suitably geared down, or a gas turbine engine driving through a gear box. In any event, the prime mover will almost certainly rotate in use at a variable speed. Referring to FIG. 2, the generator is a three stage, rotating rectifier machine whose rotors are mounted on a common shaft 13 and whose stators are fitted into a common frame (not shown). The generator 10 is fully self exciting and this is independent of all external electrical supplies. The three stages of the generators are connected in cascade, the output of the first providing excitation power for the second which in turn provides excitation power for the third. The first stage 14 is termed the pilot exciter and comprises a salient pole cog-type permanent magnet rotor 15 which provides the field for the armature 16. The armature 16 consists of a slotted, laminated core wound with a three phase, star connected distributed winding. The power output from the pilot exciter is fed into a regulator 17 (also see FIG. 1) through cables 18. The aforesaid output from the pilot exciter is rectified within the regulator 17 and is supplied from the regulator to a field winding 19, through cables 20, to excite the second stage 21. The second stage which is termed the main exciter, has a stationary salient pole field system and a rotating three phase armature 22. The latter comprises a slotted, laminated core having a three phase, star connected, distributed winding 23. The armature winding 23 is connected to diodes (illustrated diagrammatically at 24) which are connected to form a bridge and are mounted on the main exciter armature carrier. The d.c. output from the rectifier bridge is fed to a field winding 25 of the third stage 26. The third stage 26, which is termed the main generator, has a laminated, salinet pole, rotating field system 25 and an armature winding 27 which is wound into a slotted, laminated core and which is tapped at nine points to give a nine phase a.c. output. The nine phase output is rectified by a bank of 18 diodes (representing diagrammatically at 28) and the d.c. output from the diode bank is fed through cables 29 to a power controller 30 (see FIG. 1).

Figure 3:
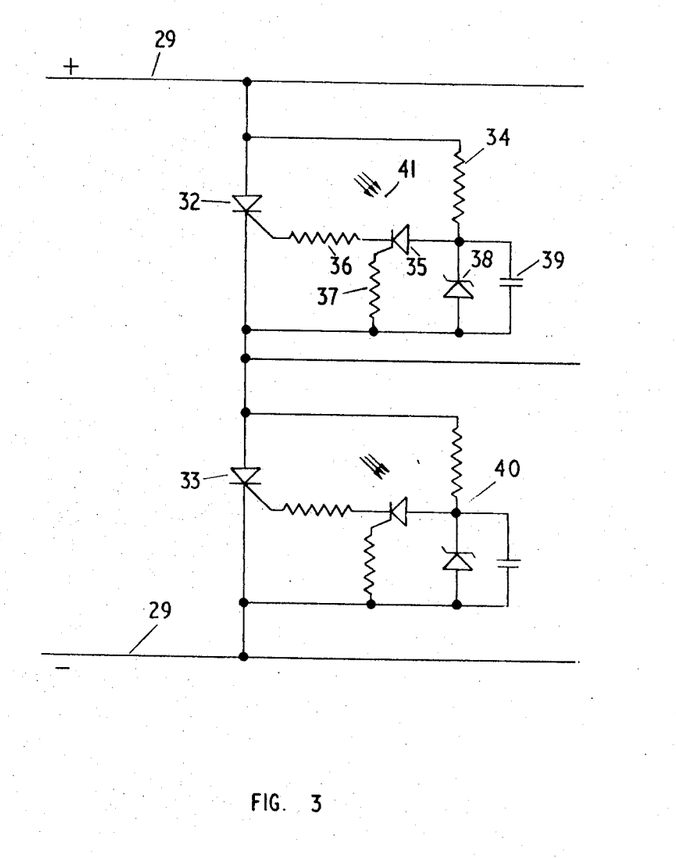
FIG. 3 is a circuit diagram of part of the power controller shown in FIG. 1.

The power controller 30 serves, in effect, as a static commutator and feeds pulses of power in a predetermined sequence into an armature winding of an inverter 31. The power controller comprises nine pairs of thyristors, each thyristor having an associated light sensitive firing circuit. One of nine sections of the power controller 31 is illustrated in FIG. 3. The section of the power controller shown in FIG. 3 comprises one pair 32, 33 of the nine pairs of thyristors, the thyristors 32 and 33 being connected electrically in series between power supply lines 29, the anode of the thyristor 32 being connected to one of the supply lines 29, whilst the cathode of the thyristor 33 is connected to the other supply line 29. The anode of the thyristor 32 is also connected through a resistor 34 to the anode of a light sensitive thyristor 35, the cathode of which is connected through a series resistor 36 to the gate of the thyristor 32, and the gate of which is connected through a series resistor 37 to the cathode of the thyristor 32. The anode of the thyristor 35 is also connected to the cathode of a zener diode 38, the anode of which is connected to the cathode of the thyristor 32. Moreover, the zener diode 38 is bridged by a capacitor 39. The elements 34 to 39 constitute a firing circuit for the thyristor 32 and the thyristor 33 is provided with a similar firing circuit represented by the general reference numeral 40. The junction between the thyristors 32 and 33 is connected as hereinafter more particularly described to a tapping on the armature winding of the inverter 31.

Each firing circuit illustrated in FIG. 3 operates in the following manner. Upon the application of the supply from the brushless d.c. generator 10, the capacitor 39 is charged through the resistor 34. The voltage across the capacitor 39 is held at, for example, 20 volts by the zener diode 38. A flash of light indicated by the reference numeral 41, and provided in a manner described more particularly hereinafter, switches on the light sensitive thyristor 35 and the capacitor 39 discharges through the thyristor 35 and the resistor 36, thus supplying the necessary current to switch on the thyristor 32. The thyristor which is a power thyristor, then supplies current to the inverter. The resistor 36 limits the current supply to the gate of the power thyristor 32 and the resistor 37 ensures that the thyristor 35 is not activated by spurious signals.

Figure 4:
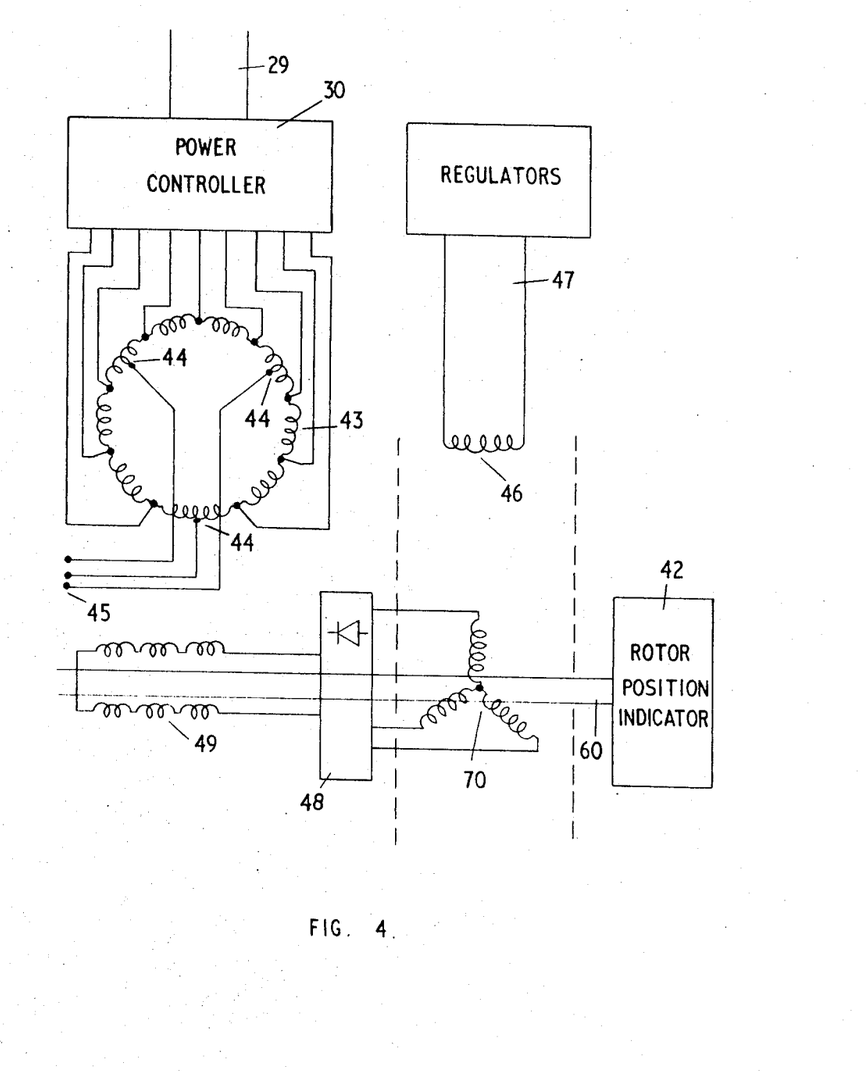
FIG. 4 is a diagrammatic representation of the inverter shown in FIG. 1.

Referring now more particularly to the inverter 31 which is shown more particularly in FIGS. 4 and 5, the mechanical construction and electrical configuration of the inverter and the generator 10 are similar except that the inverter has the pilot exciter or first stage 14 removed, and a rotor position indicator 42 (see FIG. 4) fitted in a manner which will be more particularly described hereinafter. Also the armature winding of the inverter, which winding may be in the form of a ring winding 43 (see FIG. 4), has three tap points which are indicated at 44 and which are connected to terminals 45 at which a three phase a.c. output will be produced.

A stationary exciter field winding 46 of the inverter is supplied from the pilot exciter of the generator 10 via the regulator 17 through cables 47. A three phase star connected armature winding 70 of the exciter of the inverter 31 mounted on shaft 60 has its output fed through rectifiers indicated by the general reference numeral 48 to a field winding 49 also mounted on shaft 60 and rotatable within the armature winding 43.

Figure 5:
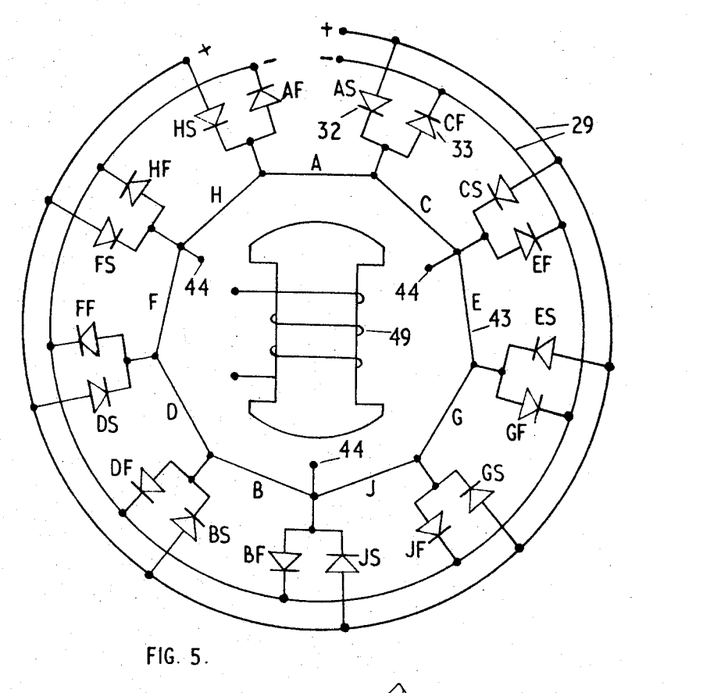
FIG. 5 is a diagrammatic representation of part of the inverter shown in FIG. 1, together with part of the power controller shown in FIG. 1.

With reference to FIG. 5, the operation of the inverter will now be more particularly described. Adjacent phases of the armature winding 43 (illustrated only diagrammatically by the letters A, C, E, G, J, B, D, F, and H) are joined together and a tapping is provided at each junction, which tapping is connected to the junction of an associated pair of thyristors 32 and 33. Assume that the field produced by the field winding 49 is rotating in an anti-clockwise direction, that d.c. is being supplied to the field winding through terminals V and W, and that at the instant shown in FIG. 5 the armature current flowing through thyristor D S, which has been turned on in a manner more particularly described hereinafter, and through two paths F, H, A, C, E and D, B, J, G. The current then passes through thyristor G F, which has also been turned on, thus completing the circuit. It is desirable to switch the thyristors when the adjacent phase winding carries minimum volts and therefore, thyristor E F is arranged to be the next thyristor in sequence to be turned on. The voltage at the junction of phases C and E is higher than that at the junction of phases G and E, and when the thyristor E F is switched on, this higher voltage is applied to the cathode of thyristor G F and with the lower voltage applied to the anode, the thyristor G F is reverse biased long enough for it to turn off. The two current paths from the armature winding then become F, H, A, C and D, B, J, G, E. As rotation of the field winding 49 continues, the next phase to approach zero voltage will be D and thyristor B S will be the next in sequence to be turned on, in turn causing the thyristor D S to be reverse biased and turn off. It will be appreciated that the operation of the thyristors is similar to the action of a commutator in a conventional d.c. machine.

It is of course essential that no two thyristors in any one associated pair are on at the same time.

If the armature winding is tapped as aforesaid at three equi-distant points 44, a three phase output will be obtained from the inverter. The quality of the a.c. wave form thus produced will be determined as in an a.c. generator by, inter alia, winding pitch and coil grouping.

The a.c. voltage output obtained from the inverter is dependent upon the d.c. voltage supply from the generator 10 and the frequency of the a.c. voltage output is dependent upon the speed of the inverter and the number of poles of the field system.

Figure 6:
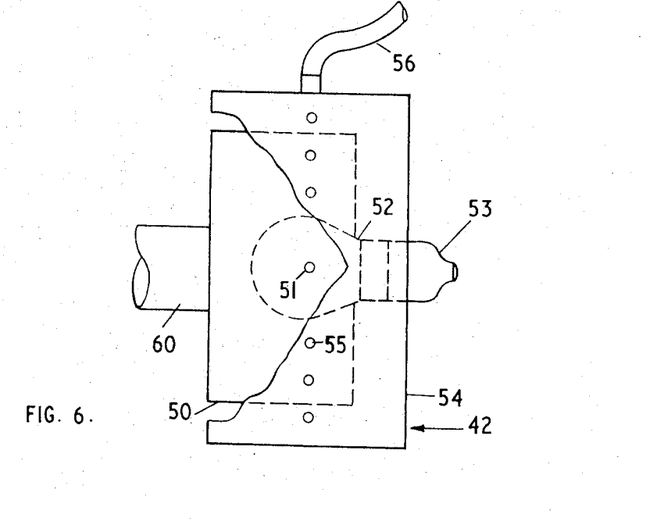
FIG. 6 is a fragmentary partly broken away view of the rotor position indicator illustrated in FIG. 1.

In order to fire the 18 power thyristors in the correct sequence and at a precise moment in time, it is necessary to sense the relative positions of the armature winding 43 and the rotating field winding 49. To meet the requirements for satisfactory operation the rotor position indicator 42 is provided (see more particularly FIG. 6). The rotor-position indicator 42 comprises an inner bell 50 which is secured to the rotatable shaft of the inverter and which is provided in its periphery with three equi-angularly spaced holes 51. The inner bell 50 surrounds a lamp 52 supported in a lamp holder 53 which is coaxial with the rotatable shaft of the inverter. There is also provided an outer bell 54 which is fixedly secured to a stationary member (not shown) and which is provided with eighteen spaced apertures 55 in its peripheral surface, adjacent apertures 55 to be aligned sequentially with the hole 51 are circumferentially spaced apart by approximately 126° so that each revolution of the inverter shaft will cause each aperture to be aligned with each hole. Each aperture 55 communicates at its outer end with a fiber-optical cable 56 which supplies light to an associated thyristor 32 or 33. Thus, 18 fiber optical cables 56 are provided each associated wtih a thyristor. Thus, upon rotation of the inner bell 50 with the inverter shaft, when the hole 51 is aligned with an aperture 55 in the outer bell, a light "flash" will be emitted, and this light flash will be transmitted to the firing circuit of the power thyristor causing it to switch on. Thus, for a single revolution of the inverter shaft each thyristor 32, 33 will be turned on and off three times. The "turning off" of each thyristor in such a manner is catered for by providing a six pole inverter field winding 49 (and not two as shown for simplicity).

Thus, to ensure that the a.c. output from the inverter is at a constant frequency the speed of rotation of the inverter shaft must be maintained at a constant value. This is achieved by a control circuit which is housed within the regulator and which senses the frequency of the inverter a.c. output through lines 61. The aforesaid control circuit then adjusts the current fed to the exciter field winding 46 of the inverter through lines 47 in such a manner as to maintain the rotational speed of the inverter shaft 60 constant.

Figure 7:
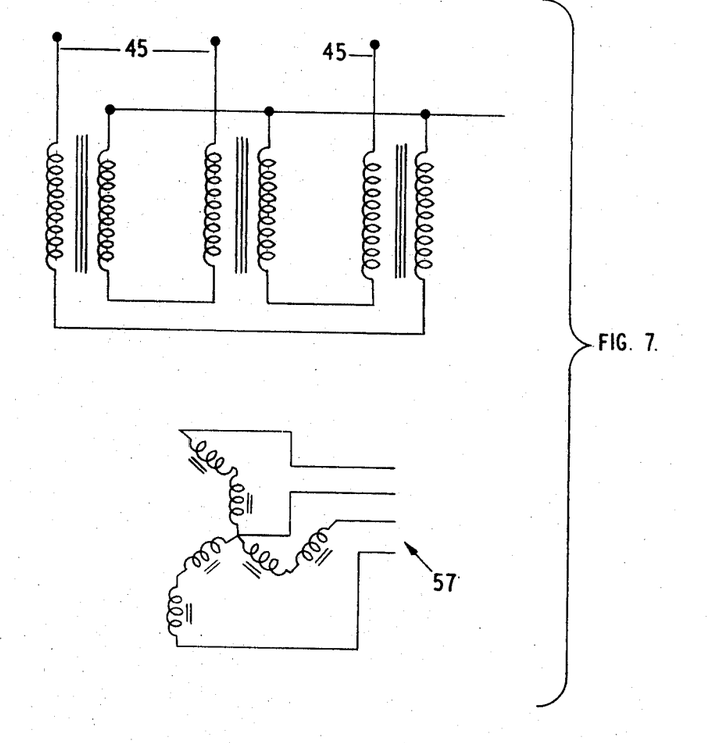
FIG. 7 is a diagrammatic representation of the static balancer shown in FIG. 1.

A static balancer 57 (see FIG. 1 and more particularly FIG. 7) provides a neutral for the system, if required, and is connected to the terminals 45. The static balancer comprises a three phase transformer with two windings on each limb. The windings are connected together so as to form a dog-leg star, and the static balancer operates in known manner.

Figure 8:
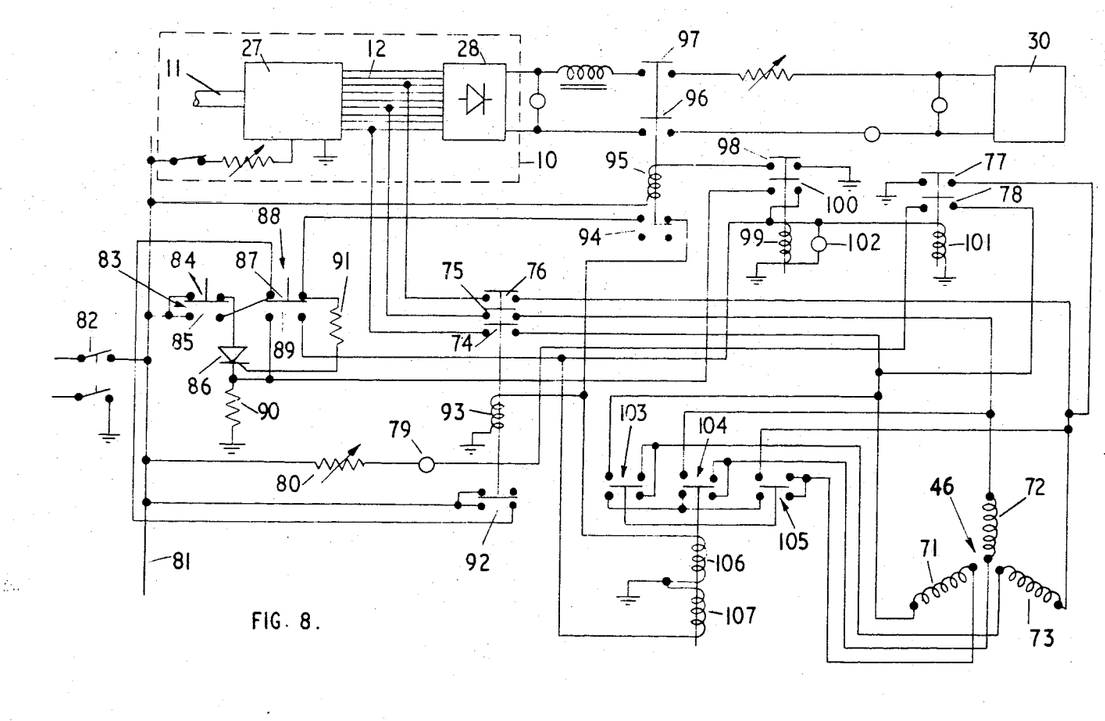
FIG. 8 is a circuit diagram of the apparatus showing switchgear used for starting up.

Referring now to FIG. 8, the exciter field winding 46 of the inverter comprises three separate windings 71, 72 and 73 which can be star or delta-connected and supplied from a three phase a.c. supply derived from the nine phase a.c. output of the main generator for starting the inverter, and the windings 71 and 73 can be connected in series and supplied from a d.c. source which is derived from the main generator output but which is varied in accordance with any change in the inverter speed so as to maintain the latter at a constant value once the inverter has been started.

One end of each of the windings 71, 72 and 73 are connected through pairs of normally open relay contacts 74, 75 and 76 respectively to a three-phase a.c. supply derived from the main generator output. Moreover, the one end of the winding 73 is connected through a further pair of normally open relay contacts 77 to earth, and the one end of the winding 71 is connected through a further pair of normally open relay contacts 78, an ammeter 78 and a variable resistor 80 to a supply line 81, to which the aforesaid d.c. supply derived from the main generator output can be connected by closing the normally open switch 82.

A manually operable switch 83 has a normally closed pair of contacts 84 and a normally open pair of contacts 85, one contact of each of the pairs of contacts 84 and 85 being connected to the supply line 81, whilst the other contact of the normally closed pair of contacts 84 is connected to the anode of a thyristor 86, and the other contact of the normally open pair of contacts 85 is connected to one contact of a pair of normally closed contacts 87 of a further manually operable switch 88 which also has a pair of normally open contacts 89. One of the contacts of the normally open pair of contacts is connected to the cathode of the thyristor 86 which is also connected through a resistor 90 to earth. Moreover, the other contact of the normally closed pair of contacts 88 is connected through a resistor 91 to the gate of the thyristor 86. The aforesaid one contact of the normally closed pair of contacts 87 is connected through a normally open relay contact 92 to a supply line 81 the contact 92 having an associated relay winding 93 which is also associated with the normally open contacts 74, 75 and 76. One end of the winding 93 is connected to earth whilst the other end is connected through a pair of normally closed relay contacts 94 to the other contact of the pair of normally closed contacts 87 of the switch 88. The normally closed contacts 94 have an associated relay winding 95 which has two further pairs of associated normally open contacts 96 and 97 which when closed connect the d.c. output of the generator 10 to the power controlled 30. One end of the winding 95 is connected through a pair of normally open relay contacts 98 to earth and the other end of the winding 95 is connected to the supply line 81. The normally open relay contacts 98 have an associated winding 99 which has a further pair of associated normally open contacts 100. Moreover, the normally open contacts 77 and 78 have an associated winding 101. The windings 99 and 101 are connected electrically in parallel between ground and the other contact of the normally open pair of contacts 89 of the switch 88 which other contact of the pair 89 is connected to one of the normally open contacts 100. The other of the contacts of the pair 100 is connected to the cathode of the thyristor 86. The winding 99 is bridged by a time delay circuit 102 for a purpose which will be explained hereinafter.

There is also provided three further relays 103, 104 and 105, each of which has two pairs of normally open contacts. The plungers of the three relays 103, 104, 105 are connected together and these plungers have two associated windings 106 and 107, the winding 106 being connected between earth and the junction between winding 93 and the normally closed pair of relay contacts 94 and the winding 107 being connected between earth and the other contact of the normally open pair of contacts 89. Energization of the winding 106 causes movement of the three plungers in one direction, thereby to close one pair of contacts associated with each of the three relays and energization of the winding 107 will cause movement of the plungers in the other direction so as to close the other pair of contacts associated with each relay. One contact of each of the two pairs of contacts associated with each relay 93, 94 and 95 is connected to the other end of the winding 73, 72, 71, respectively. The other contact of one of the pairs of contacts of the relay 93 is connected to an equivalent contact of the relay 94 and the relay 95. The remaining contact of the relay 93, 94 and 95 is connected, respectively, to said one end of the winding 71, 72 and 73, respectively.

Now, in operation, and so as to start the inverter, the switch 82 is closed and the manually operable switch 83 is operated so as to open the pair of contacts 84 and close the pair of contacts 85. Also now with the generator 10 operating so as to produce an output, the d.c. supply will be connected through the closed pair of contacts 85, the closed pair of contacts 87, the closed pair of contacts 94, so as to energize the relay winding 93. This causes the pairs of relay contacts 74, 75, 76 and 92 to close, thereby connecting three phase a.c. supply to the windings 71, 72 and 73. The winding 106 is also energized and this causes the plungers to move up (as viewed in the drawings) thereby delta-connecting the windings 71, 72 and 73. The inverter will, in consequence, run up to speed. Whilst the inverter is running up to speed the voltage will be applied to the gate of the thyristor 86 through the resistor 91 and this is latched through the pair of contacts 92.

Now when the inverter has run up to speed, the manually operable switch 83 is released thereby opening the pair of contacts 85 and closing the pair of contacts 84. The thyristor 86 will now conduct, and if the switch 88 is subsequently depressed thereby opening the pair of contacts 87 and closing the pair of contacts 89, the winding 93 will be de-energized. As a result of de-energization of the winding 93, the pairs of contacts 74, 75, 76 and 92 will now open thereby removing the three phase a.c. supply to the winding 71, 72 and 73. The winding 106 will also be de-energized. However, the supply line 81 will be connected through the pair of contacts 84, the thyristor 86, and the pair of contacts 89, so as to energize the winding 107 and also so as to energize the winding 101. Energization of the winding 107 will cause the plungers to move down (as viewed in the drawing) thereby connecting the other ends of the three windings 71, 72 and 73 together. Moreover, energization of the winding 101 will close the two pairs of contacts 77 and 78 so as to apply a d.c. voltage across the windings 71 and 73. The speed of the inverter will now be determined by the voltage applied to the windings 71 and 73.

After a short time delay, effected by the delay circuit 102, the winding 99, will be energized thereby closing the pairs of contacts 98 and 100. Supply through the thyristor 86 will therefore be maintained through the pair of contacts 100 and the manually operable switch 98 can be released. Moreover, closure of the pair of contacts 98 will effect energization of the winding 95 thereby closing the pairs of contacts 96 and 97 so as to connect the output of the generator 10 to the power controller 30. De-energization of the windings 71 and 73 can then only be effected by either opening the switch 82 or by depressing the manually operable switch 84 so as to remove the voltage across the anode-cathode of the thyristor 86.

Moreover, switch 88 can be operated automatically such as by example after a time delay to ensure speed attained or, by a speed transducer signal.

Figure 9:
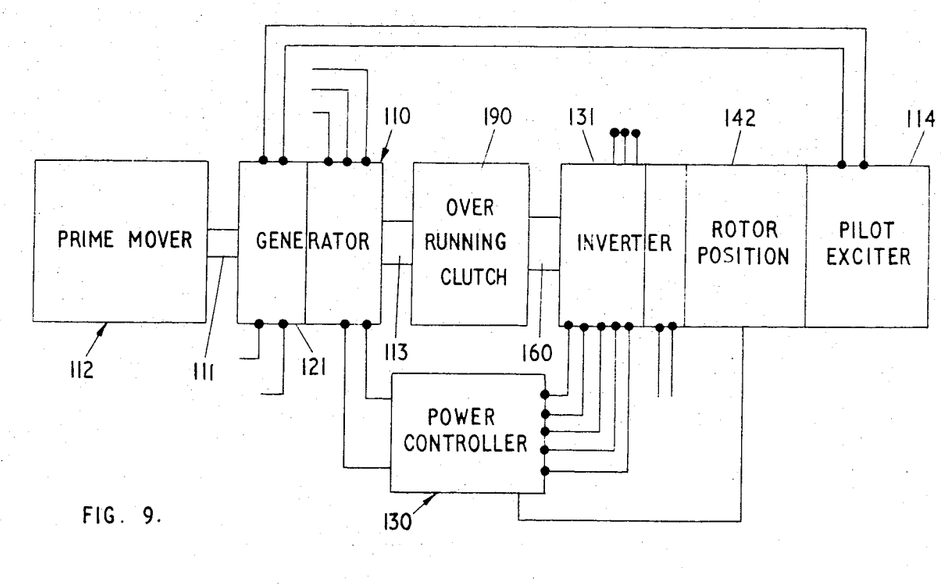
FIG. 9 is a diagrammatic view of another starting up arrangement.

In the alternative arrangement shown in FIG. 9 a mechanical starting system is employed. In this case the generator 110 and the inverter 131 are arranged with their shafts 113, 160 co-axial and an overrunning clutch 190 is connected between these shafts so that the inverter shaft 160 cannot rotate at a speed less than that of the generator shaft 113. For compactness the pilot exciter 114 of the generator 110 may then be transferred to the inverter shaft 160.

While there has been shown what is considered to be the preferred embodiment of the invention, it will be obvious that modifications may be made which come within the scope of the disclosure of the specification.

What is claimed is:

1. Electrical generating apparatus comprising a source of d.c. supply and an inverter, said inverter comprising an armature winding, a freely rotatable field winding associated with said armature winding, a plurality of connections spaced around said armature winding, and switch means for intermittently connecting said d.c. source to said connections in synchronism with the rotation of the field winding in a manner in which an a.c. output will be produced in use at at least one terminal of said armature winding, the frequency of the a.c. output being related to the speed of operation of said switch means and the rotating field winding.

2. Apparatus as claimed in claim 1, in which said source comprises an electrical a.c. generator, a variable speed prime mover for driving said generator, and rectifying means for rectifying the variable frequency a.c. output of said generator.

3. Apparatus as claimed in claim 1 in which said switch means comprises a plurality of semi-conductor switching elements equal in number to twice the number of said connections around said armature winding, each connection being connected to the junction of two series connected semi-conductor switching elements which are connected across said source of d.c. supply.

4. Apparatus as claimed in claim 3, comprising a shaft rotatable with said rotatable field winding, means on said shaft for switching the plurality of semi-conductor switching elements from a non-conductive to a conductive state in a predetermined sequence, the speed of rotation of said shaft determining the rate of switching said semi-conductor switching elements.

5. Apparatus as claimed in claim 4 in which said semi-conductor switching elements are in the form of thyristors, and a light sensitive firing circuit being associated with each thyristor.

6. Apparatus as claimed in claim 5 in which said means mounted on said shaft comprises an apertured drum, a light source within said drum, and a plurality of fiber optical cables arranged around said drum, said means upon rotation being adapted to allow light to pass from said light source to said plurality of fiber optical cables, and being associated, respectively, with the thyristor firing circuits.

7. Apparatus as claimed in claim 2, comprising an exciter armature rotatable with the rotatable field winding, and a fixed exciter field winding connectable to said d.c. supply, said d.c. supply to the rotatable field winding being derived through rectifiers from said exciter armature.

8. Apparatus as claimed in claim 7 in which said exciter field winding is a three phase winding having switch means for alternatively connecting it to the d.c. supply and to the output of the variably driven a.c. generator so as to act together with the exciter armature winding as an a.c. motor for starting purposes.

9. Apparatus as claimed in claim 2 in which the a.c. generator includes a shaft, and an overrunning clutch connecting said shaft to the inverter shaft so as to prevent the inverter shaft from rotating more slowly than the a.c. generator shaft.

* * * * *